US007446288B2

(12) United States Patent
Boege et al.

(10) Patent No.: US 7,446,288 B2
(45) Date of Patent: Nov. 4, 2008

(54) DEVICE INCLUDING INDUCTIVELY HEATABLE FLUID RETAINMENT REGION, AND METHOD

(75) Inventors: Steven J. Boege, San Mateo, CA (US); Mark F. Oldham, Los Gatos, CA (US); Marc Haberstroh, San Jose, CA (US); Stephen J. Gunstream, San Francisco, CA (US); Adrian Fawcett, Pleasanton, CA (US); Douglas W. Grunewald, Livermore, CA (US)

(73) Assignee: Applied Biosystems Inc., Foster City, CA (US)

( * ) Notice: Subject to any disclaimer, the term of this patent is extended or adjusted under 35 U.S.C. 154(b) by 0 days.

(21) Appl. No.: 11/417,756

(22) Filed: May 4, 2006

(65) Prior Publication Data

US 2007/0012683 A1 Jan. 18, 2007

Related U.S. Application Data

(60) Provisional application No. 60/678,737, filed on May 6, 2005.

(51) Int. Cl.
*H05B 6/10* (2006.01)
*F16K 49/00* (2006.01)

(52) U.S. Cl. ....................................... 219/628; 137/341

(58) Field of Classification Search ................. 219/628, 219/629, 630, 631, 687, 772; 137/341; 138/33
See application file for complete search history.

(56) References Cited

U.S. PATENT DOCUMENTS 3,821,058 A 6/1974 Miller
4,456,581 A 6/1984 Edelmann et al.
4,498,896 A 2/1985 Leis
4,632,908 A 12/1986 Schultz
5,232,667 A 8/1993 Hieb et al.
5,412,171 A * 5/1995 Yahav et al. ................ 219/621
5,679,457 A 10/1997 Bergerson
5,849,208 A 12/1998 Hayes et al.
5,914,065 A 6/1999 Alavi
6,046,442 A * 4/2000 Kawamura et al. .......... 219/667

(Continued)

FOREIGN PATENT DOCUMENTS

WO WO 99/60381 11/1999

(Continued)

OTHER PUBLICATIONS

Pal, Debjani et al., "A Portable Battery-operated Chip Thermocycler based on Induction Heating", Sensors and Actuators A, 2002, vol. 102, pp. 151-156, Elsevier.

(Continued)

*Primary Examiner*—Daniel L Robinson

(57) ABSTRACT

A device is provided that comprises one or more fluid retainment regions each having at least one wall, and one or more loops in heat-transfer communication with the at least one wall. Each of the loops can comprise an electrical conductor that surrounds the same or a different fluid retainment region. A device is provided that comprises one or more fluid retainment regions each having particulates disposed therein. A system is provided that includes a platen adapted to hold a device including fluid retainment regions and one or more electrical conductors in heat-transfer communication with the fluid retainment regions. Methods of heating a sample are also provided.

14 Claims, 9 Drawing Sheets

U.S. PATENT DOCUMENTS

| | | | |
|---|---|---|---|
| 6,153,012 | A | 11/2000 | Rupp et al. |
| 6,348,176 | B1 | 2/2002 | Hammer et al. |
| 6,482,638 | B1 | 11/2002 | Patil et al. |
| 6,635,492 | B2 | 10/2003 | Gunter |
| 6,713,297 | B2 | 3/2004 | McMillan et al. |
| 6,717,118 | B2 | 4/2004 | Pilavdzic et al. |
| 6,734,401 | B2 | 5/2004 | Bedingham et al. |
| 6,818,437 | B1 | 11/2004 | Gambini et al. |
| 6,859,050 | B2 | 2/2005 | van de Goor et al. |
| 6,889,468 | B2 | 5/2005 | Bedingham et al. |
| 7,008,789 | B2 | 3/2006 | Gambini et al. |
| 2002/0047003 | A1 | 4/2002 | Bedingham et al. |
| 2002/0106314 | A1 | 8/2002 | Pelrine et al. |
| 2003/0066830 | A1 | 4/2003 | Reed et al. |
| 2003/0152492 | A1 | 8/2003 | Chang et al. |
| 2004/0001780 | A1 | 1/2004 | Schirr et al. |
| 2004/0014202 | A1 | 1/2004 | King et al. |
| 2004/0038390 | A1 | 2/2004 | Boege et al. |
| 2004/0072335 | A1 | 4/2004 | Boege et al. |
| 2004/0178357 | A1 | 9/2004 | King |
| 2005/0180890 | A1 | 8/2005 | Bedingham et al. |
| 2005/0184060 | A1* | 8/2005 | Stark et al. .................. 219/634 |
| 2005/0279949 | A1 | 12/2005 | Oldham et al. |
| 2006/0219709 | A1* | 10/2006 | Kagan ........................ 219/661 |

FOREIGN PATENT DOCUMENTS

| | | | |
|---|---|---|---|
| WO | WO 01/07890 | A2 | 2/2001 |

OTHER PUBLICATIONS

Notification of Transmittal dated Sep. 4, 2007, from PCT Application No. PCT/US06/17377.

International Search Report dated Sep. 4, 2007, from PCT Application No. PCT/US06/17377.

Written Opinion of International Searching Authority dated Sep. 4, 2007, from PCT Application No. PCT/US06/17377.

International Preliminary Report on Patentability dated Nov. 15, 2007 from PCT/US2006/017377 with Written Opinion.

* cited by examiner

DEVICE INCLUDING INDUCTIVELY HEATABLE FLUID RETAINMENT REGION, AND METHOD

CROSS REFERENCE TO RELATED APPLICATION

The present application claims benefit under 35 U.S.C. § 119(e) from earlier filed U.S. Provisional Application No. 60/678,737, filed May 6, 2005, which is herein incorporated by reference in its entirety.

INTRODUCTION

The present teachings relate to a device and method for regulating the temperature of a fluid in a fluid retainment region using one or more heating elements.

SUMMARY

According to various embodiments, a fluid processing device is provided that can comprise a substrate, a plurality of fluid retainment regions disposed in or on the substrate, and one or more conductors in heat-transfer communication with at least one of the plurality of fluid retainment regions. Each of the one or more conductors can comprise a material adapted to be inductively heated by a magnetically-induced electric current.

According to various embodiments, a fluid processing device is provided that can comprise one or more fluid retainment regions each comprising at least one wall and one or more loops in heat-transfer communication with the at least one wall of at least one of the one or more fluid retainment regions and surrounding at least one of the one or more fluid retainment regions. Each of the one or more loops can comprise a material adapted to be inductively heated by a magnetically-induced electric current.

According to various embodiments, a fluid processing device is provided that can comprise one or more fluid retainment regions and a biological material suspension disposed in the fluid retainment region. The biological material suspension can comprise magnetic material particulates adapted to be heated by a magnetically-induced electric current in one or more of the magnetic material particulates.

According to various embodiments, a fluid processing system is provided that can comprise: a holder adapted to hold one or more fluid processing devices comprising a substrate and a plurality of fluid retainment regions disposed in or on the substrate; an electrical conductor in heat-transfer communication with at least one of the plurality of fluid retainment regions, when a fluid processing device is disposed in the holder; and a magnetic field source adapted to form a varying magnetic field in the electrical conductor. The electrical conductor can be adapted to be heated by an electric current induced by the varying magnetic field.

According to various embodiments, a fluid processing system is provided that can comprise: a holder adapted to hold one or more fluid-processing devices; a magnetic field source adapted to form a magnetic field; and a drive device adapted to cyclically move at least one of the holder and the magnetic field source relative to the other of the holder and the magnetic field source, such that in operation of the drive device a magnetic field generated by the magnetic field source induces at least one eddy current in the electrical conductor to heat the electrical conductor. Each fluid-processing device can comprise one or more fluid retainment regions and an electrical conductor surrounding at least one of the one or more fluid retainment regions and in heat-transfer communication with at least one of the one or more fluid retainment regions.

According to various embodiments, a method is provided that can comprise: generating a varying magnetic field; and heating a plurality of fluid samples disposed in a plurality of fluid retainment regions in heat transfer communication with an electrical conductor adapted to be heated by an eddy current induced by the varying magnetic field wherein the plurality of fluid retainment regions are disposed in or on a substrate.

According to various embodiments, a method is provided that can comprise: providing one or more fluid retainment regions one or more magnetically-inducible electrical-conductors surrounding the one or more fluid retainment regions and in heat-transfer communication with at least one of the one or more fluid retainment regions, and a fluid sample disposed in the one or more fluid retainment region; providing a magnetic field; and moving the one or more electrical conductors cyclically through the magnetic field to cause current through the electrical conductor and heat the fluid sample.

According to various embodiments, a container is provided that can comprise one or more fluid retainment regions each having at least one wall, and one or more loops in heat-transfer communication with the at least one wall and surrounding the one or more fluid retainment regions. The loops can loop around the one or more fluid retainment regions. An electrical circuit comprising the loops and a resistive element in heat-transfer communication with the at least one wall, can induce a current in the loops and can energize the resistive element. Each of the one or more loops can comprise an element in which electrical currents can be induced to result in inductive heating of the element. The one or more loops can comprise a spiral or a plurality of loops wherein each loop is electrically isolated from the others of the plurality of loops. Heat-transfer communication between the one or more fluid retainment regions and the one or more loops can be established by one or more of conduction, convection, and radiation.

According to various embodiments, a system is provided that can comprise a platen adapted to hold a fluid-processing device, a magnetic field source adapted to form a magnetic field, and a drive device adapted to move at least one of a fluid-processing device held on or in the platen, and the magnetic field source, relative to one another. The fluid-processing device can include one or more fluid retainment regions and one or more electrical conductors each in heat-transfer communication with a respective one of the fluid retainment regions. During operation of the system, the magnetic field can form at least one eddy current in the one or more electrical conductors. The one or more electrical conductors can each include a resistive heater or a partially conductive electrical circuit. The one or more electrical conductors can each be shaped to complement an outer periphery of at least one of the one or more fluid retainment regions. The one or more electrical conductors can comprise a plurality of electrical conductors electrically isolated from one another. Heat-transfer communication can be established between the one or more electrical conductors and the one or more fluid retainment regions, by one or more of conduction, convection, and radiation.

According to various embodiments, a fluid-processing device is provided that can be used with a system as described herein. The device can comprise a substrate having an axis of rotation, a plurality of fluid retainment regions disposed in or on the substrate, and one or more electrical conductors in heat-transfer communication with at least one of the fluid retainment regions. The fluid retainment regions can be disposed in or on a surface of the substrate. The one or more electrical conductors can comprise a plurality of electrical conductors each electrically isolated from one another. Each electrical conductor can include a resistive heater. The substrate can comprise an electrically insulating material, a plastic material, and/or a thermally conductive material having a thermal conductivity of about 0.5 Watts per meter Kelvin (W/m° K) or greater, for example, about 1.0 W/m° K or greater. Each electrical conductor can comprise a pinch point or relatively narrow section adapted to locally modify current flow.

According to various embodiments, a fluid-processing device is provided that can comprise a substrate, a plurality of fluid retainment regions disposed in or on the substrate, and a plurality of electrical conductors electrically isolated from one another and each in heat-transfer communication with at least one of the fluid retainment regions. The fluid retainment regions can be disposed in or on a surface of the substrate. The electrical conductor can further comprise a pinch point or relatively narrow portion adapted to locally modify current flow.

According to various embodiments, a device is provided that comprises one or more fluid retainment regions and particulates disposed in a suspension in the fluid retainment region. The particulates can comprise a magnetic material having an average particulate diameter of about 50 micrometers (microns) or less. A system comprising the device and an oscillating magnetic field system is also provided.

According to various embodiments, a method is provided for inducing an electrical current in a fluid-processing device and heating a fluid retainment region of the device. The method can comprise providing a substrate, one or more fluid retainment regions disposed in or on the substrate, and one or more magnetically-induceable electrical conductors disposed in heat-transfer communication with the fluid retainment region, and a fluid sample disposed in the one or more fluid retainment regions. The method can further comprise providing a magnetic field and moving the one or more electrical conductors through the magnetic field to create a current and thus cause the one or more electrical conductors to heat-up. The magnetic field can be static or dynamic. The method can comprise heating the one or more fluid retainment regions. At least one of the one or more electrical conductors can comprise an electrically-resistant material. Moving the one or more electrical conductors can comprise spinning the substrate. The one or more electrical conductors can comprise a plurality of electrical conductors each electrically isolated from the others. The one or more fluid retainment regions can comprise a plurality of fluid retainment regions, for example, a plurality of chambers or wells.

According to various embodiments, a method is provided that comprises providing one or more fluid retainment regions each containing a particulate that comprises a magnetic material having an average particle diameter of about 50 micrometers or less, and applying a magnetic field to the particulates.

Additional features and advantages of the present teachings will be set forth in part in the description that follows, and in part will be apparent from the description, or may be learned by practice of the present teachings.

BRIEF DESCRIPTION OF THE DRAWINGS

Various embodiments of the present teachings are exemplified in the accompanying drawings. The teachings are not limited to the embodiments depicted, and include equivalent structures and methods as set forth in the following description and as known to those of ordinary skill in the art. In the drawings.

Figure 1:
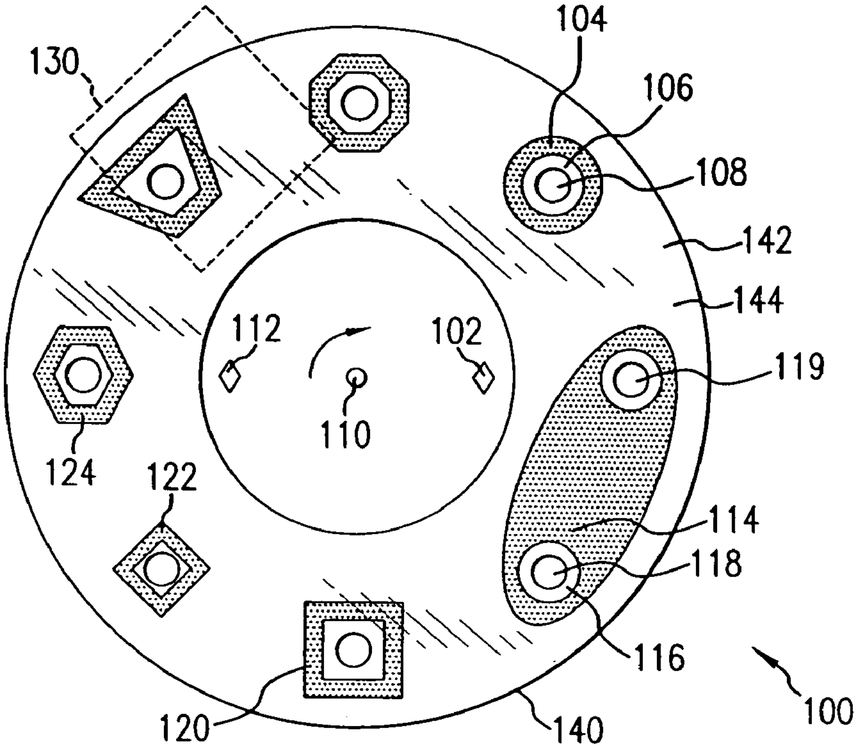
FIG. 1 is a top view of a fluid-processing device according to various embodiments.

It is to be understood that both the foregoing general description and the following detailed description are exemplary and explanatory only and are intended to provide a further explanation of various embodiments of the present teachings.

DESCRIPTION OF VARIOUS EMBODIMENTS

According to various embodiments, the fluid processing device can comprise a fluid retainment region having at least one wall and a plurality of loops in heat-transfer communication with the at least one wall. Each of the loops can comprise an element in which currents can be induced to result in inductive heating of the element. Each loop can be electrically isolated from the other of the plurality of loops. Each loop does not have to be completely electrically isolated from the other of the plurality of loops, for example, the loops can be shaped as a plurality of unconnected rings, a spiral, a helix, or other set of loops formed from a single length of an electrical conductor, for example, a wire, a film, or an electrical lead comprising a coating of an electrical conductor disposed in or on a printed circuit board (PCB). The electrical conductor can be electrically isolated between adjacent edges of the loops. The loops can be connected serially or in parallel. Heat-transfer communication can be established by one or more of conduction, convection, and radiation.

According to various embodiments, the inductively-heatable material of the one or more loops can comprise a material that is adapted to increase in temperature when exposed to an alternating magnetic flux, for example, through eddy-current heating. The inductively-heatable material can be used to power an electrical circuit comprising resistance intentionally built into an inductively-induced current path. According to various embodiments, the system can heat a fluid retainment region with heat generated from the loops themselves. The system can heat a fluid retainment region that is in heat-transfer communication with a resistor or resistors that can be intentionally fabricated or disposed adjacent, at, or near the fluid retainment region. The fabricated resistor can be trimmed, for example, by a laser, after manufacture, to be within acceptable tolerances. The electrical resistor or resistors can each have a resistance of, for example, 1 ohm per linear foot or greater, 10 ohms per linear foot or greater, 100 ohms per linear foot or greater, or 1000 ohms per linear foot or greater.

If a plurality of loops are provided, they can be evenly or unevenly spaced from one-another. At least one of the one or more loops can be provided in the form of a film, a coating, a layer, a thin sheet, a thin coating of an electrically conductive material, a thin coating of metal, a wire, or a combination thereof. The one or more loops can be corrosion resistant. The one or more loops can be inert or coated such that the loops do not act as contaminants to fluids in the fluid retainment region.

The material to be inductively heated is referred to herein as an electrically conductive material, whether it is a solid, a fluid, or both. Resistance and permeability can vary substantially in conductive materials. Suitable materials can be classified by their magnetic properties as diamagnetic materials, paramagnetic materials, and/or ferromagnetic materials. Suitable diamagnetic materials that can be used include copper, gold, and silver. Suitable paramagnetic materials that can be used can include aluminum, platinum, alloys thereof, and combinations thereof. Suitable ferromagnetic materials that can be used include iron, nickel, steel, rare earth metals, alloys thereof, and combinations thereof.

According to various embodiments, heat can be generated in the electrically-conductive material by subjecting the material to a magnetic field, where either the conductive material or the magnetic field is in motion. According to various embodiments, a varying or moving magnetic field can be used to produce eddy currents in the conductive material of the one or more loops. A changing magnetic field can be used to cause rapid movement of the electrons in the conductive material, and thereby generate heat. Permanent magnet heating can be used whereby high flux densities can be generated directly in the area of a loop and/or loop material to be heated. Variables that effect the amount of heat generated can include: the strength of the magnetic field, the magnetic flux density, the magnetic field intensity, the number of magnets, the spacing between the permanent magnets, the relative speed of movement between the permanent magnets and the electrical conductor, the material to be heated, the flux density, the rate at which the flux lines are cut by or moved through, the loops, and the resistance of the system. Other factors that can be modified to effect the amount of heat generated are the resistivity, permeability, size, and shape, of the loop of material to be heated, and the magnet size and shape. The greater the magnetic field strength is, the greater the heat generated in a conductive material passing through the magnetic field. A greater relative speed causes greater heat generation.

According to various embodiments, the at least one wall of the fluid retainment region can comprise an electrically insulating material. The at least one wall can comprise a plastic material. The at least one wall can comprise a thermally conductive material having a thermal conductivity of, for example, about 0.5 W/m° K or greater, about 1.0 W/m° K or greater, or about 5.0 W/m° K or greater. The thermal conductivity of the thermally conductive material can be even lower than about 0.5 W/m° K, if the wall is relatively thin, for example, about one millimeter or less in thickness, or about 0.1 millimeters or less in thickness. The at least one wall can comprise a conical portion, a cylindrical portion, a pyramidal portion, a frusto conical portion, or a combination of such portions. The at least one wall can be of other shapes, for example, a generally rectangular shape. The at least one wall can comprise one or more sidewalls. The one or more loops can comprise a plurality of loops disposed on an outer periphery of the at least one wall, on an inner periphery of the at least one wall, in a body portion of the at least one wall, at or on a surface of the at least one wall, or disposed in, at, or on a combination thereof. According to various embodiments, the at least one wall can comprise one or more electrical conductors and the one or more loops can comprise a plurality of loops that are electrically isolated from the wall.

According to various embodiments, each fluid retainment region can comprise an opening and the container can further comprise a cap to seal the opening. The cap can be removably attachable to seal the opening. The container can comprise a fluid sample disposed in the fluid retainment region. The sample can be electrically isolated from the one or more loops. The cap itself can be a surface in or on which loops can be disposed.

The fluid retainment region can have a volume, for example, of from about 0.05 nl to about 100 ml, from about 1 nl to about 50 ml, from about 10 nl to about 10 ml, from about 100 nl to five ml, or from about 1000 nl to about two ml. The container can comprise a connecting member, for example, a substrate, and a plurality of fluid retainment regions can be formed in or on the connecting member.

According to various embodiments, a system is provided that can comprise a platen adapted to hold a fluid-processing device, for example, with or in a holder. The fluid-processing device can comprise one or more fluid retainment regions and one or more electrical conductors, each in heat-transfer communication with at least one of the one or more fluid retainment regions. The system can comprise a magnetic field source adapted to form a magnetic field, and a drive device adapted to move the one or more fluid retainment regions and/or the magnetic field source relative to the other. During operation of the system, the magnetic field can form at least one eddy current in the one or more electrical conductors. The one or more electrical conductors can include, for example, a resistive heater or a partially conductive electrical circuit. The one or more electrical conductors can be shaped to complement an outer periphery of at least one fluid retainment region of the one or more fluid retainment regions. The one or more electrical conductors can comprise a plurality of electrical conductors electrically isolated from one another. Heat-transfer communication can be established between the one or more electrical conductors and the one or more fluid retainment regions by one or more of conduction, convection, and radiation. According to various embodiments, a loop can be disposed away from the sample, and the current induced in the loop can be conducted to a resistive element proximate the sample.

According to various embodiments, the system can comprise a substrate having a surface, and fluid retainment regions disposed in or on the surface. At least one of the fluid retainment regions can comprise a cavity or recess disposed in or on the surface. At least one of the fluid retainment regions can comprise a frame or recess capable of holding or accommodating a sample container, for example, a vial or tube. There can be a one to one correspondence between the one or more fluid retainment regions and the one or more electrical conductors. There can be a one to n correspondence between the fluid retainment regions and the plurality of electrical conductors, wherein n can be greater than one, for example, 2, 5, 10, 25, or more. There can be an n to 1 correspondence between the fluid retainment region and the one or more electrical conductors. Separated loops can be made from a common conductor. Resistors can be in series or in parallel.

According to various embodiments, the magnetic field source can comprise a pair of magnets arranged with a north pole of one of the magnets aligned with a north pole of the other magnet of the pair, and a gap can be provided between the magnets. At least one of the one or more fluid retainment regions can be disposed in the gap or aligned to be moved through the gap. The magnetic field source can comprise a pair of magnets arranged with a north pole of one of the magnets aligned with a south pole of the other of the magnets, and a gap can be provided between the magnets. At least one of the one or more fluid retainment regions can be disposed in the gap or aligned to be moved through the gap. The magnetic field source can comprise at least one of a permanent magnet or an electromagnet. The magnetic field source can comprise a plurality of magnets or magnetic field sources. The magnetic field source can be adapted to oscillate a generated magnetic field.

According to various embodiments, a single magnet, for example, a horseshoe shaped magnet, can be configured with a small gap, and the loops can pass through the gap. The fluid retainment region does not need to pass through the gap, whereas the one or more electrical conductors can pass through the gap. According to various embodiments, a single large loop, having inner and outer edges with different respective radii, can be configured to have an edge, for example, the inner edge, pass outside the gap while the other (outer) edge of the loop can pass inside the gap. This can cause the magnetic flux lines to be cut by the loop as the disk is rotated and can induce a current in the loop.

According to various embodiments, the platen can comprise a rotatable platen having a center of rotation. The platen can comprise a substrate holder capable of holding a substrate. According to various embodiments, the drive device can be adapted to move the loops relative to the magnetic field source, for example, in a circular pattern and through the magnetic field. The drive device can be adapted to spin the container, loops, and fluid retainment regions relative to the magnetic field source. The system can comprise a drive control device adapted to control the drive device.

According to various embodiments, the system can comprise a magnetic field source control device adapted to control the magnetic field source. The magnetic field source control device can be adapted to control the magnetic field strength by at least one of moving the magnetic field source, varying a current passing through the magnetic field source, varying a relative velocity of movement between the magnetic field source and the one or more loops, varying the frequency of an oscillation of the magnetic field, varying the strength of the magnetic field directly, for example, with an electromagnet, providing an alternate path for the magnetic field, or a combination thereof. Controlling the magnetic field strength can comprise one or more of controlling magnetic flux density, controlling magneto motive force, and controlling magnetic field intensity.

According to various embodiments, the system can comprise at least one air circulation or disturbance device that can be provided to create an air current in heat-transfer communication with at least one of the one or more loops or one or more of the fluid retainment regions. The air circulation device can comprise, for example, a cooling fin or fan blade attached to the substrate or formed integrally therewith, or attached to or formed with the magnetic field source. The system can comprise a temperature sensor adapted to measure a temperature of at least one of the one or more fluid retainment regions.

According to various embodiments, a method can be provided for heating a fluid sample by inducing a current in a fluid-processing device. The method can comprise providing a substrate, one or more fluid retainment regions disposed in or on the substrate, and one or more electrical conductors each disposed in heat-transfer communication with one or more of the fluid retainment regions. The method can further comprise providing or generating a magnetic field and moving the one or more electrical conductors through the magnetic field. The method can comprise moving the one or more electrical conductors relative to the magnetic field and heating the one or more fluid retainment regions. An electrical conductor can comprise an electrically-resistant material. In other embodiments, an electrical conductor can comprise a pinch point or narrowed thickness in a portion thereof. In various embodiments, an electrical conductor can comprise a resistor added in series with a loop.

According to various methods, one or more samples can be provided in one or more of the fluid retainment regions. The sample can comprise an electrolyte. The method can comprise spinning the substrate. The one or more electrical conductors can comprise a plurality of electrical conductors, each electrically isolated from the others. The one or more fluid retainment regions can comprise a plurality of fluid retainment regions. The method can involve the use of any of the devices, containers, or systems described herein.

According to various embodiments, the method can comprise manipulating a magnetic field strength of the magnetic field by at least one of varying a distance between the one or more electrical conductors and the magnetic field source, varying a current passing through the electro-magnetic field source, varying a relative velocity of movement between the magnetic field source and the one or more fluid retainment regions, varying a frequency of an oscillation of the magnetic field, varying the flux density passing through an area of the electrical conductors by moving the magnet or by shunting the flux, or by varying a combination of such parameters.

According to various embodiments, the method can comprise sensing a temperature of at least one of the one or more fluid retainment regions. The method can comprise controlling the temperature of the at least one fluid retainment region to obtain a desired operating temperature, for example, within an acceptable deviation range. The method can comprise using a radiant temperature sensor to detect the temperature of one or more fluid retainment regions. The temperature sensor can be powered by the power generated by the inductive coupling system. The temperature sensor can be powered by other non-contact methods, for example, by optical energy transfer. The temperature sensor can be powered directly by a system that is not rotated, or powered through rotating contacts. The temperature sensor can transmit its data optically, using RF transmissions, by varying the impedance of the inductive coupling system, or by direct electrical communication.

The temperature of the conductor, and in turn the temperature of the fluid retainment region, can be inferred by utilizing a conductor material that has a permeability that changes with an operating temperature.

The temperature of a conductor and thus the temperature of a fluid retainment region can be inferred by determining the change in resistivity of a conductor by using a conductor material having a temperature dependent resistivity.

According to various embodiments, one or more magnets can be used to induce currents in the one or more electrical conductors while in motion, for example, by moving the one or more electrical conductors. The current can be used, for example, to heat samples without having to create or maintain a conductive path from a fixed power supply to the container.

The container can be a single use container, for example, a sample vial, tube, or well. The one or more fluid retainment regions can be formed in or on a platen, formed in a multi-well tray, mounted in a frame, held by a fluid retainment region holder, or mounted using a fixture mount known in the art that is in heat-transfer communication with the one or more fluid retainment regions.

According to various embodiments, the system can use a static magnetic field. The static magnetic field can be provided by a permanent magnet or an electromagnet. The static magnetic field can induce at least one eddy current in an electrical conductor by, for example, a cyclical motion of the electrical conductor relative to the magnetic field. The magnets can be configured as bar magnets, horseshoe magnets, or other magnet configurations known in the art.

Energy transfer into configurations utilizing stationary magnetic fields can be increased by increasing angular velocity. The amount of current produced and thus the amount of heat delivered to a sample can be increased by increasing a rate of the cyclical movement, for example, by spinning a device-holding platen or by increasing the angular velocity.

According to various embodiments, a system can provide a time varying magnetic field as the magnetic field source. The energy to induce at least one current in at least one conductor can be supplied by a circuit driving the electromagnets. The amplitude of an induced current and/or heat generated can be changed by increasing a distance between the fluid-processing device and the magnetic field source, by changing an angular velocity of a cyclically moving fluid retainment region, by changing the magnetic field strength, by changing a frequency of the magnetic field oscillation, or by a combination thereof.

According to various embodiments, variable power can be delivered to each sample of a plurality of samples by changing the aforementioned parameters in synchronization with the cyclical movement of one or more of the electrical conductors through the magnetic field.

According to various embodiments, the relative cyclical motion can be provided by, for example, spinning the fluid-processing device while holding the magnet still, spinning the magnet while holding the fluid-processing device still, spinning the magnet and the fluid-processing device at different relative angular velocities, spinning the magnet and the fluid-processing device in opposing directions, or vibrating one of or both of the fluid-processing device and the magnet. The relative motion can be defined by a field of travel for either or both of the magnetic field source and the fluid-processing device. The field of travel can be planar. The direction of the magnetic field can alternate in adjacent sectors of the field of travel, increasing the amount of field change a particular electrical conductor is exposed to.

According to various embodiments, a constant power level can be supplied to some or all electrical conductors disposed in thermal contact with a fluid retainment region by a magnetic field. In other embodiments, different power levels can be supplied to different electrical conductors by a magnetic field. This can allow for different heating of fluid retainment regions in thermal contact with the electrical conductors. Power levels can be varied to different sections of a fluid processing device. A gradient or a step function can provide separate temperature zones across a fluid processing device. Synchronization of a cyclical movement between a magnetic field source and an electrical conductor, for example, spinning can be provided using a stepper motor and/or dead-reckoning, for example, by including a "home sensor" for synchronization of a motion of a holder holding the fluid processing device, for example, a platen. In other embodiments, power levels can be different across a fluid processing device by using varying resistance levels of electrical conductor, for example, a film can comprise a pinch point or an extra resistor in series with the electrical conductor. A holder can support a plurality of fluid processing devices. Different power levels can be supplied to each one of the fluid processing devices disposed in or on the holder using, for example, varying magnetic field strengths.

According to various embodiments, an induced current can be used to power an electrical circuit. For example, the induced current can be converted into heat by using a resistive heater material as the electrical conductor. The amount of current induced and/or heat generated can be controlled. A distance between the electrical conductor and the at least one magnet can be increased or decreased to respectively reduce or increase the magnetic field strength that the electrical conductor is exposed to. A change in the angular velocity of a cyclically moving conductor can affect the amount of the induced current.

The field strength can be modified by changing the coupling of magnetic flux from one or both sides of a magnet to concentrate the flux into a desired area of a fluid-processing device comprising an electrical conductor. The field strength can be modified by moving the magnet in a desired direction, so that the flux density at the position of the fluid-processing device is increased or diminished.

According to various embodiments, at least one fin, air disturbance mechanism or other element or elements to facilitate heat transfer through one or more of conduction, convection, and radiation can be provided on a drive, a shaft, a platen supporting the fluid retainment region, or the like. The magnetic field can be turned off or decreased in strength, while the conductor is cyclically moved at a higher angular velocity. The fins can form an air flow. The air flow can transfer heat away from the fluid retainment region through convection. As angular velocity is increased, more heat can be transferred away from the fluid retainment region. The fluid retainment region can be cooled by increasing the angular velocity and the cooling can comprise extinguishing or diminishing the magnetic field.

According to various embodiments, the resistivity of the electrical conductor or loops described above can be tuned to direct a desired amount of heat toward specific portions of a fluid retainment region. Within practical limitations, the current in all of the loops undergoing the same change in magnetic field can be the same. Thus, the current induced in each of the loops can be the same amount. By changing the resistance of a desired loop, the power or thermal energy generated in the loop's electrical conductor material can be effected directly according to the formula $P=I^2R$, wherein P is power, I is current, and R is resistance.

According to various embodiments, induction heating of a fluid retainment region can be provided. The electrical conductor can be ferrous or non-ferrous. The electrical conductor can be disposed as a loop. The electrical conductor can be in a shape other than a loop. Spinning the fluid retainment region can be useful, for example, to even out variability in the shape of the magnetic field across the fluid retainment region.

According to various embodiments, a sample can be inductively heated using inert micron-sized metallic beads in a suspension. The sample can be heated from within by subjecting the micro sized beads to an oscillating magnetic field. The oscillating magnetic field can be formed using a permanent magnet or an electromagnet. The oscillation of the magnetic field can be achieved by a relative movement of a fluid retainment region wherein the particulates are disposed and a movement of the magnet itself. The magnetic beads or particulates can be micron-sized having an average diameter of, for example, from about 0.05 microns to about 100 microns, from about 0.5 microns to about 25 microns, or from about 10 microns to 20 microns. The beads can heat up through induction and in turn can heat up a surrounding or enveloping sample. The particulates can comprise any magnetic material. Currents induced by a magnetic field can be used to heat the sample. The particulates can be combined with reagents. The reagents can comprise a primer, a probe, and a dye, for example, a PCR master mix. The reagents and/or particulates can be loaded at time-of-use or preloaded at manufacturing. The fluid retainment regions and samples therein can be subjected to thermal cycling by controlling the oscillating magnetic field.

According to various embodiments, internal induction heating can provide a number of advantages over present PCR thermal cycling. A sample can be heated from the inside out. This can potentially increase ramp rates as well as thermal homogeneity of the sample. It can be possible to control, for example, the temperature, heating or cooling rate of a sample, or thermal homogeneity of a sample, by varying the concentration of beads in the sample. It can be possible to have different cycling temperatures for each fluid retainment region in a plurality of the fluid retainment regions without modifying the thermal control algorithms of a thermal cycler adapted to operate on a plurality of fluid retainment regions. The particulates can be used for sample preparation, sample thermal manipulation, sample mixing, sample purification, post-reaction sample processing, or a combination thereof, in an integrated manner. For example, the particulates can be used for lysing, heating, mixing, and/or purification when a samples is subjected to a PCR. The particulates can be used, for example, in a purification step and a heating step. The particulates can be used for example, in a lysing step and a heating step. The particulates can be used as beads or supports. These beads or supports are typically used in the field of biochemistry, for example, for nucleic acid sequence amplification, for purification and/or separation techniques, or for synthesizing oligonucleotides. Thus, it can be possible to perform thermal cycling on a sample after an initial preparation process has occurred using the same particulates.

According to various embodiments, the fluid retainment region containing the particulates can be adapted for use in optical detection systems, for example, spectroscopy, for example, luminance, fluorescence, or translucence. Optical detection can be optimized and detection interference can be reduced by moving the particulates away from a focal point of the detection system, for example, the particulates can be trapped against a wall of a fluid retainment region by a steady, non-oscillating, magnetic field that is oriented or shaped to trap the particulates.

According to various embodiments, a fluid processing device is provided that comprises one or more fluid retainment regions and particulates disposed in the fluid retainment region. The particulates comprise a magnetic material that can have an average particulate diameter of about 50 microns or less. The device can comprise a suspension wherein the particulates are suspended. The particulates can comprise a ferromagnetic material. The particulates can comprise at least one of a diametric material or a paramagnetic material. The particulates can comprise micron-sized metallic beads having an average diameter of about 0.05 microns to about 25 microns. The particulates can be inert. The particulates can be coated with an inert material comprising, for example, a plastic.

According to various embodiments, a system is provided that comprises the fluid processing device and an oscillating magnetic field system adopted to form an oscillating magnetic field traversing the one or more fluid retainment regions. The oscillating magnetic field system can comprise an electromagnet and an oscillating power supply. The oscillating magnetic field system can comprise a permanent magnet and a device adapted to provide a relative motion to the permanent magnet and the fluid retainment region.

According to various embodiments, a method is provided that comprises providing one or more fluid retainment regions with particulates disposed therein and applying an oscillating magnetic field to the particulates. The particulates can comprise a magnetic material having an average particulate diameter of 50 microns or less. The particulates can be provided in a suspension. The method can comprise heating a sample in the fluid retainment region by induction heating of the particulates. The method can comprise sensing a temperature of the sample. The method can comprise thermal cycling the sample. The method can comprise achieving and maintaining the sample at a desired temperature. The method can comprise alternating a pattern of the oscillating magnetic field to impart a motion onto the particulates thus mixing the sample. The method can comprise storing a nucleic acid sequence with the particulates, for example, an oligonucleotide synthesizer can bind synthesized oligonucleotides to the particulates. The method can provide storing a PCR master mix with the particulates. The method can comprise detecting an optical property of the sample. The detection can comprise detecting an optical property of a sample wherein the particulates are moved away from the focal point of an optical detection system. The optical detection can comprise, for example, the fluorescence detection of a reaction or real-time PCR detection. The particulates can comprise purifying particles, for example, size-exclusion ion-exchange particles and the method can comprise purifying a sample and/or reaction products with the particulates. The sample can comprise a PCR master mix, one or more nucleic acid sequences, one or more enzymes, a buffer, one or more probes, one or more primers, and/or one or more other components for a nucleic acid sequence amplification, sequencing, purification, labelling, and/or detection assay.

Referring now to the drawings, FIG. 1 is a top view of a fluid-processing device 100 according to various embodiments. Fluid retainment regions 108, 118, 119 can be disposed in or on a surface 142 of a substrate 140. Electrical conductors as exemplified by reference numerals 104, 114, 120, 122, 124, can be disposed in or on surface 142 of substrate 140. Although differently shaped electrical conductors are illustrated, all the electrical conductors of the device can be of the same size and/or shape. A portion of the substrate or another material that differs from the electrical conductor can intervene between an outer periphery of a fluid retainment region and the electrical conductor. For example, an outer peripheral wall 106 can be disposed around fluid retainment region 108 and the electrical conductor. Outer peripheral portions 106, 116 need not be present at all. For some conductors, the sample can be in direct fluid communication with the electrical conductor.

Temperature sensors 102, 112 can be disposed at one or more locations around fluid-processing device 100, as desired. Temperature sensors 102, 112 can be disposed proximate to a desired fluid retainment region. Device 100 can comprise one or more sensors.

Substrate 140 can comprise a plastic material, for example, a polycarbonate, a polyolefin, a polypropylene, and/or a cyclic polyolefin copolymer such as TOPAS, available from Ticona (Celanease AB) of Summit, N.J., USA. Electrical conductor 104, 114, 120, 122, 124 can comprise a metal, metal oxide, and/or metal alloy material. According to various embodiments, electrical conductor 104, 114, 120, 122, 124 can comprise carbon or carbon nanotubes. Electrical conductor 104, 114, 120, 122, 124 can be disposed on the surface 142 of substrate 140, for example, as a film, as an electroplate layer, or co-molded with carbon. According to various embodiments, each electrical conductor can be in heat-transfer communication with two or more respective fluid retainment regions, for example, electrical conductors 114 is shown in heat-transfer communication with fluid retainment regions 118 and 119. Electrical conductors 120 and 122 are shown as squares, electrical conductor 124 is shown as a hexagon, 104 is shown as a ring. Various other shapes and sizes, including other polygon shapes, can be used for the electrical conductors.

Fluid-processing device 100 can be used with a system comprising a magnetic field source that generates a magnetic field 130. Magnetic field 130 can intercept or traverse electrical conductors 104, 114, 120, 122, 124, upon rotation of substrate 140 about a center of rotation 110. A periodic or cyclic intersection or transversal of magnetic field 130 relative to electrical conductor 104, 114, 120, 122, 124, can induce a current in electrical conductor 104, 114, 120, 122, 124. The current can be an eddy current.

The loops can intercept flux lines. The conductor can traverse magnetic field lines by a moving of the magnetic source, or by using an alternating magnetic source. According to various embodiments, the flux lines can pass through the apertures associated with the fluid confinement zones, and the induced current can flow in a circle around the fluid retainment region. In these and other embodiments, the conductor can comprise an electrically conductive material, for example, aluminum, copper, iron, other metals, alloys, conductive carbon material, combinations thereof, and the like.

Although many of the conductors exemplified in FIG. 1 and elsewhere herein appear as loops around a confinement zone, it is to be understood that according to various embodiments, conductor shapes other than loops can be instead or additionally implemented.

Figure 2:
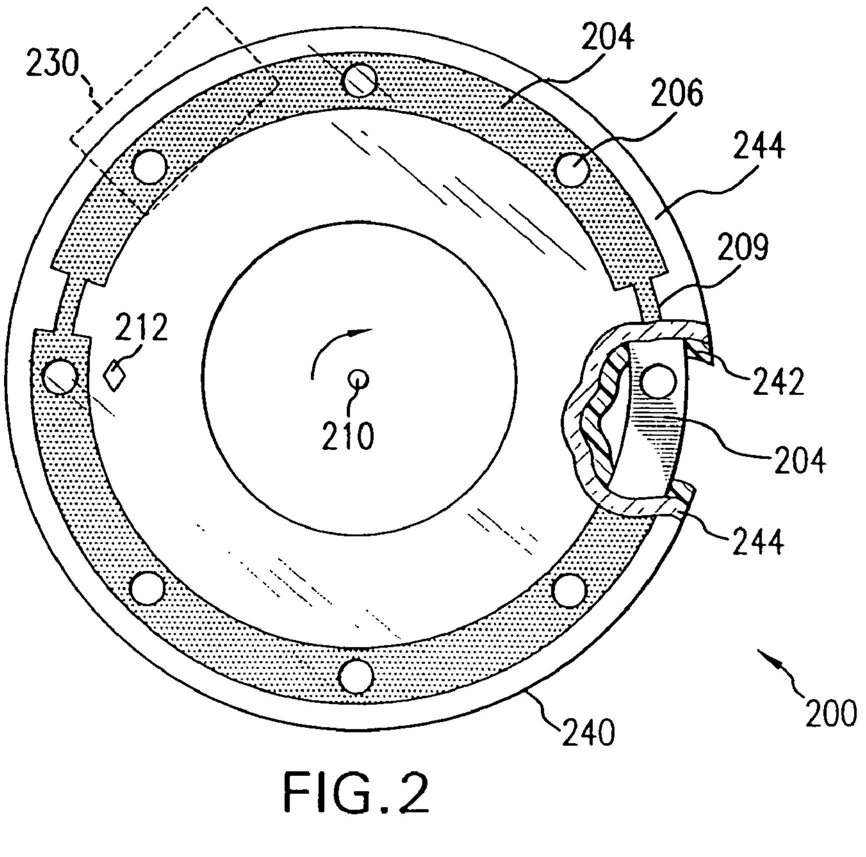
FIG. 2 is a top view of a fluid-processing device according to various embodiments.

FIG. 2 is a top view of a fluid-processing device 200 comprising a plurality of fluid retainment regions exemplified as region 206. Fluid retainment region 206 can be in heat-transfer communication with an electrical conductor 204. Electrical conductor 204 can comprise at least one pinch point 209 where the thickness of electrical conductor 204 narrows. Pinch point 209 can be used to restrict or limit the flow of an eddy current in electrical conductor 204 and can be used to control heating.

Fluid-processing device 200 can be formed in or on a substrate 240. Substrate 240 can include a surface 242 and electrical conductor 204 can be disposed as a film on surface 242, for example, as a separate layer laminated on top of surface 242. Electrical conductor 204 can be disposed in multiple layers, for example, stacked one upon the other. There can be an electrical insulator between the electrical conductor layers, to increase the number of turns for electrical conductor 204. According to various embodiments, substrate 240 can comprise a laminate with layers of metal interspersed with other materials, for example, a printed circuit board. In operation, a magnetic field 230 can traverse and intersect electrical conductor 204 when fluid-processing device 200 is spun about a center of rotation 210. A temperature sensor 212 can be disposed in or on substrate 212, for example, in close proximity to one or more respective fluid retainment regions. Remote temperature sensing of fluid retainment regions can be used. A cover layer 244, for example, a thin, transparent, polymeric film or substrate can be disposed on top of one or both of surface 242 and electrical conductor 204.

Figure 3:
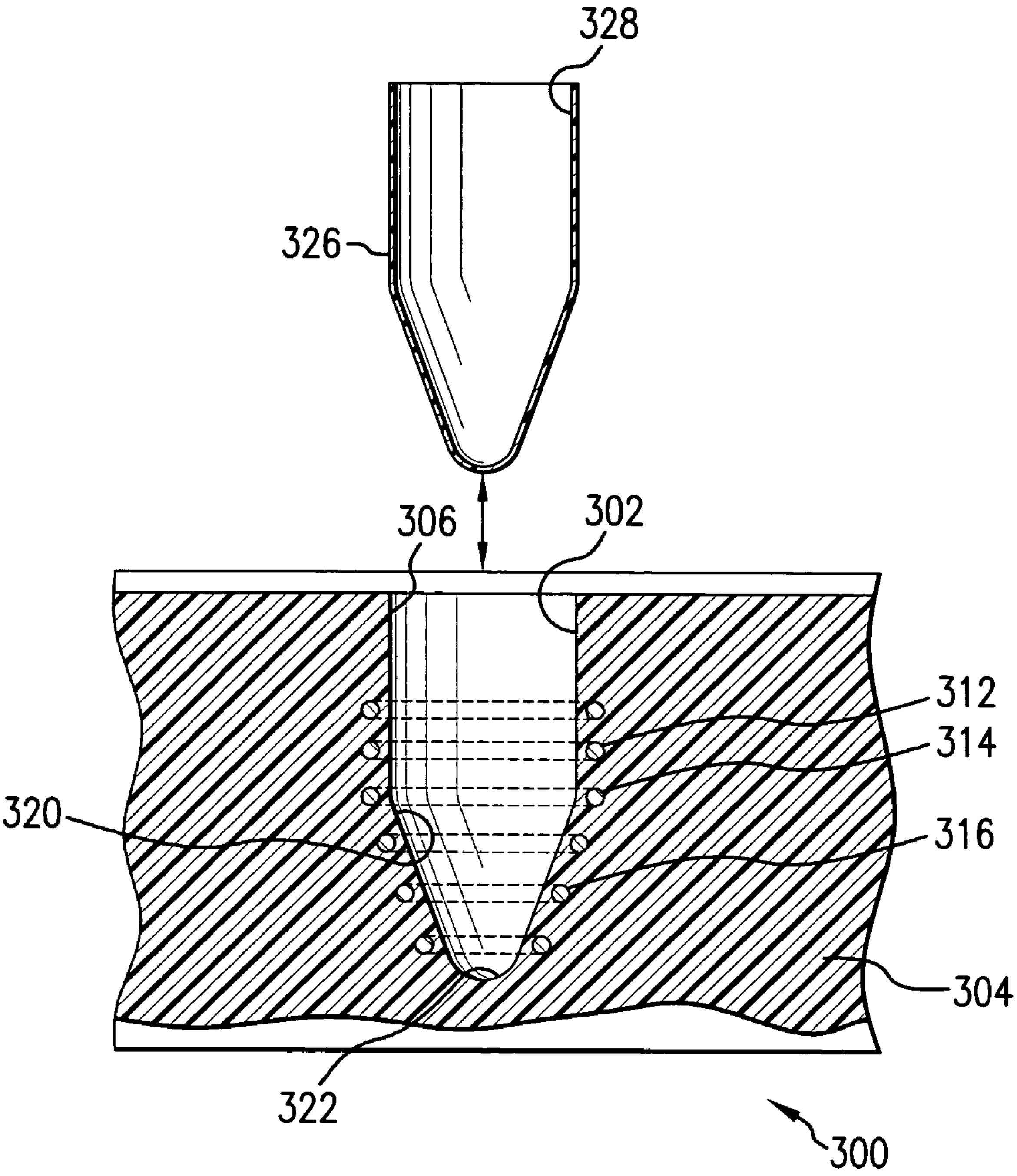
FIG. 3 is a partial side cross-sectional view of a fluid retainment region and a sample vial according to various embodiments.
Figure 4:
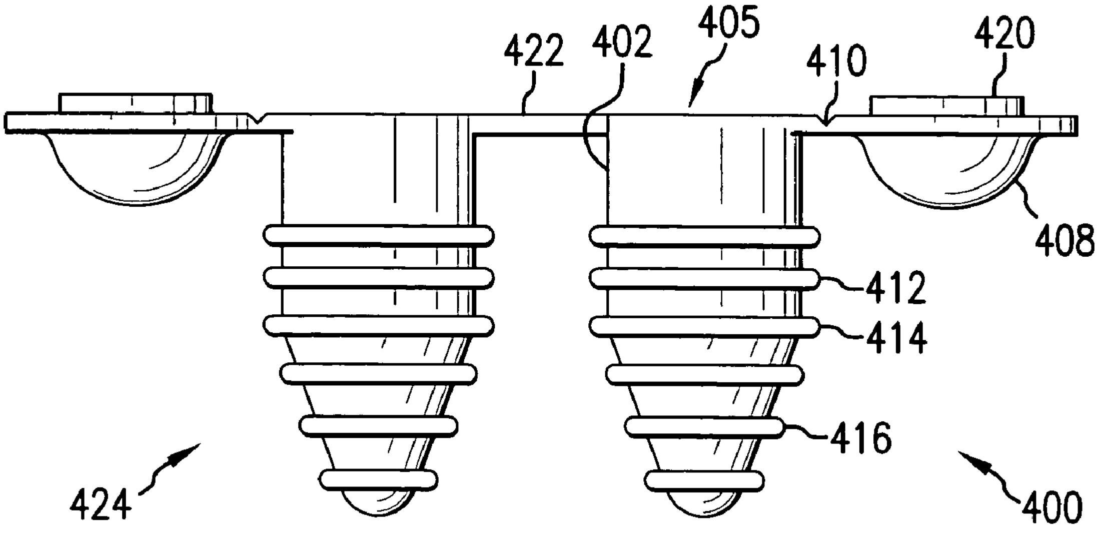
FIG. 4 is a side view of a container comprising two fluid retainment regions and two corresponding caps according to various embodiments.

FIG. 3 is a partial cross-sectional, side view of a fluid-processing device 300 comprising a fluid retainment region 302 disposed in a substrate 304. Fluid retainment region 302 can comprise a sidewall 306. Loops, exemplified by those labeled 312, 314, and 316, can be disposed in substrate 304 proximate to and/or along wall 306. Loops 312, 314, and 316 can be spaced apart. The spacing between loops 312, 314, and 316 can be uneven or even. Loops 312, 324, and 316 can be segments of a helix, creating a single multi-loop coil. The spacing between loops 312, 314, and 316 can be increased or decreased to provide more or less heat to a particular portion of fluid retainment region 302, as desired. The resistivity of the wire can be increased or decreased, for example, by changing a circumference of the wire. A decrease in the spacing between loops 312, 314, and 316 can provide an increased amount of heat proximate wider portions of fluid retainment region 302, whereas greater spacing distances can be used where the cross-sectional area of fluid retainment region 302 narrows. Fluid retainment region 302 can comprise a conical portion 320 and/or a cylindrical portion. Other shapes amenable to retain a fluid know in the art are also possible As shown in FIGS. 3 and 4, the loops can be spaced farther apart as they approach the apex of the cone if less heating is desired at the smaller diameter portions of the fluid retainment region. Fluid retainment region 306 can comprise a partial sphere 322.

Fluid retainment region 306 can be disposed in multi-well tray, a tray shaped as a micro-titer tray, in a card-type device, or in any other suitable substrate. A sample can be disposed in fluid retainment region 302. A sample tube 326 can be removably disposed in fluid retainment region 302 and a sample can be disposed in sample tube 326. Heat generated by loops 312, 314, and 316 can be conveyed to the sample through fluid retainment region wall 306 and through sidewall 328 of sample tube 326.

FIG. 4 is a side view of a device 400, according to various embodiments. Device 400 can include a wall 402 and a plurality of loops comprising electrical conductors 412, 414, 416 can be disposed around an outer periphery of wall 402. Electrical conductors 412, 414, 416 can be segments of a helix, creating a single multi-loop coil. A respective cap 408 can be attached to wall 402 of each fluid retainment region, for example, using a connector 410. A fluid retainment region can be defined by inner surface of wall 402 and can comprise an opening 405. A connecting member 442 can inter-connect device 400 to another identical or different device 424. Cap 408 can comprise a lip 420 that can tightly fit against the inside surface of wall 402, to seal fluid retainment region of device 400. Connector 410 can be pliable and can be capable of bending to allow lip 420 to be removably fit against wall 402 without breaking. Connector 410 can be designed so that cap 408 can be hinged, perforated, or separable relative to device 400.

According to various embodiments, multiple loops of an electrical conductor can be disposed in or around a respective fluid retainment region. As shown in FIGS. 3 and 4, the spacing of the loops can be tuned to the amount of heat needed in a particular portion of the fluid retainment region. Portions of the fluid retainment region with a larger thermal mass, for example, the wider top portion of a sample tube device shown can have the loops spaced closer together, whereas the loops disposed at the bottom of the sample tube device shown, where the thermal mass can be lower, can have loops spaced further apart. Such loop arrangements are depicted in FIG. 3 and FIG. 4, for example.

Figure 5:
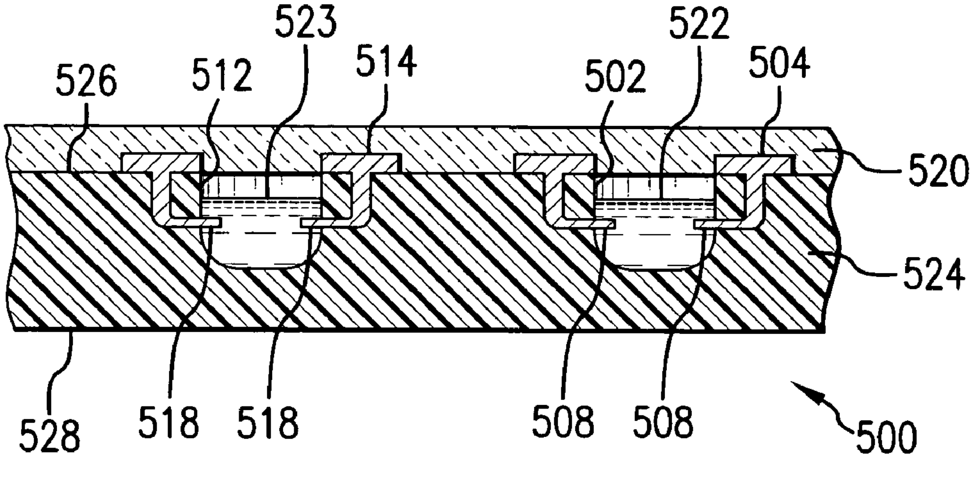
FIG. 5 is a partial cross-sectional side view of a fluid retainment region according to various embodiments.

FIG. 5 is a side cross-sectional view of a fluid-processing device 500. Fluid-processing device 500 can comprise one or more fluid retainment regions 502, 512 disposed in a surface 526 of a substrate 524. Fluid retainment regions 502, 512 can each be shaped as a well or a cavity in substrate 524. Electrical conductors 504, 514 can be disposed around the outer periphery of fluid retainment regions 502, 512, respectively. Electrical conductors 504, 514 can be disposed to form a single loop circuit on surface 526. Electrodes 508, 518 can supply a current induced in electrical conductors 504, 514, to a respective sample 522, 523 disposed in fluid retainment regions 502, 512, respectively. Samples 522, 523 can comprise an electrolyte. The electrolyte can provide a decreased resistance to an electrical current compared to a sample that is not an electrolyte. Electrical conductor 504, 514 can have lower resistance than the electrolyte. A second surface 528 of substrate 524 can have a film 520 disposed thereupon. Film 520 can be a cover for fluid retainment regions 502, 512. Film 520 can comprise a coating. Film 520 can be a thermal insulator, electrical insulator, a thermal conductor, or an electrical conductor, as desired. When Film 520 comprises an electrical conductor, Film 520 can be heated. Film 520 can form additional or alternative loop structures.

Figure 6A:
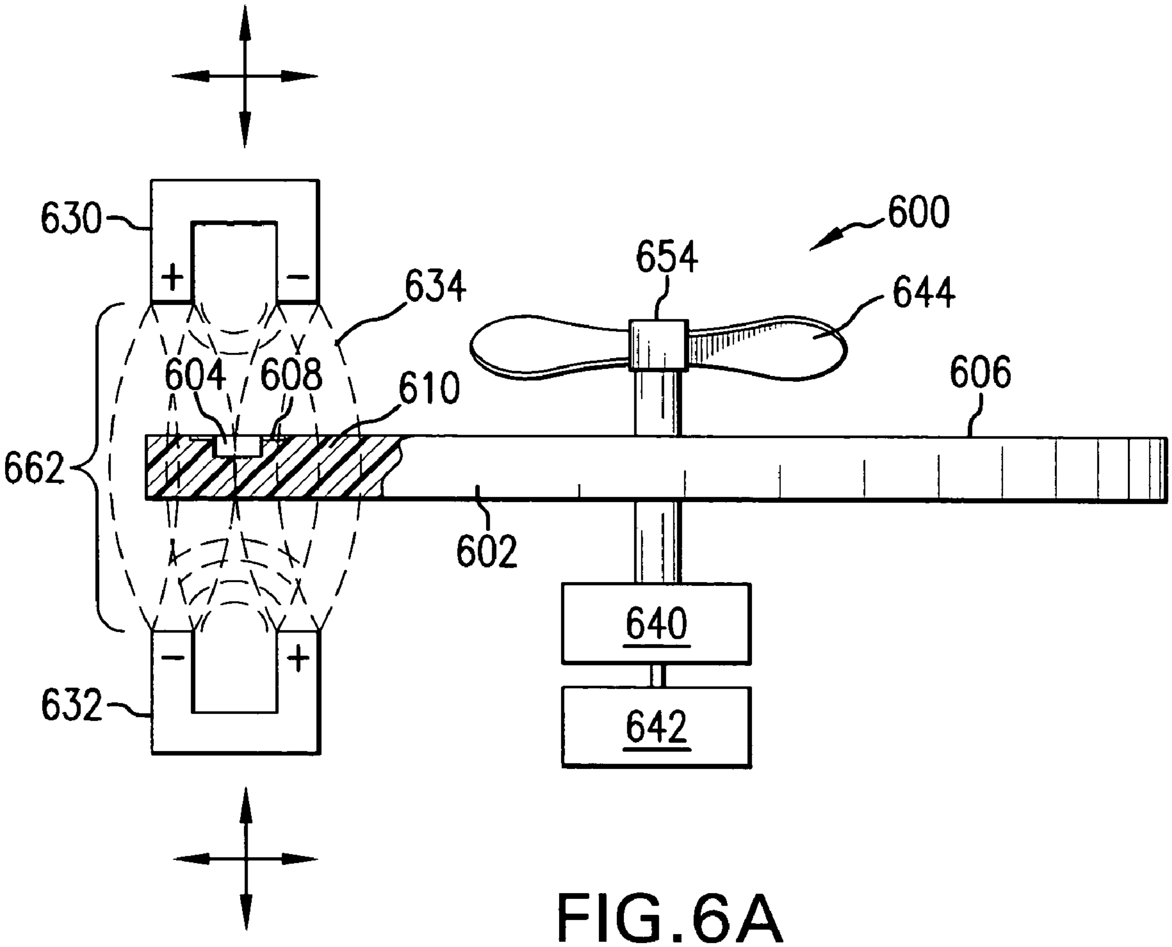
FIG. 6A is a side, partial cross-sectional view of a system according to various embodiments.

FIG. 6A is a side view in partial cross-section of a system 600 according to various embodiments. A platen 602 can be spun by a shaft 654. Platen 602 can comprise a fluid retainment region 604 disposed in a surface 606 of platen 602. Platen 602 can comprise a thermal insulator material 610. An electrical conductor 608 can be disposed around fluid retainment region 604. Fluid retainment region 604 can traverse through a magnetic field 634 formed by magnets 630, 632. Shaft 654 can be propelled directly or via a transmission (not shown) using a drive device 640. Drive device 640 can be controlled by a drive control device 642. Magnets 630, 632 can be moved radially, towards or away from shaft 654. Magnets 630, 632 can be moved to change the length of gap 662. Adjustments to the length of gap 662 between magnets 630, 632 can be used to manipulate the strength of magnetic field 634 provided by magnets 630, 632. The pole of magnet 630 can be arranged to align with an opposite pole of magnet 632, for example, a north pole of magnet 630 can be arranged in alignment with a south pole of magnet 632, or similar poles can be aligned. The poles of a single horseshoe magnet can comprise magnets 622, 624, respectively. Platen 652 can transverse a gap in the horseshoe magnet. A cooling device, for example, fan blades 644 can be provided on shaft 654 or arranged co-axially with shaft 654.

Figure 6B:
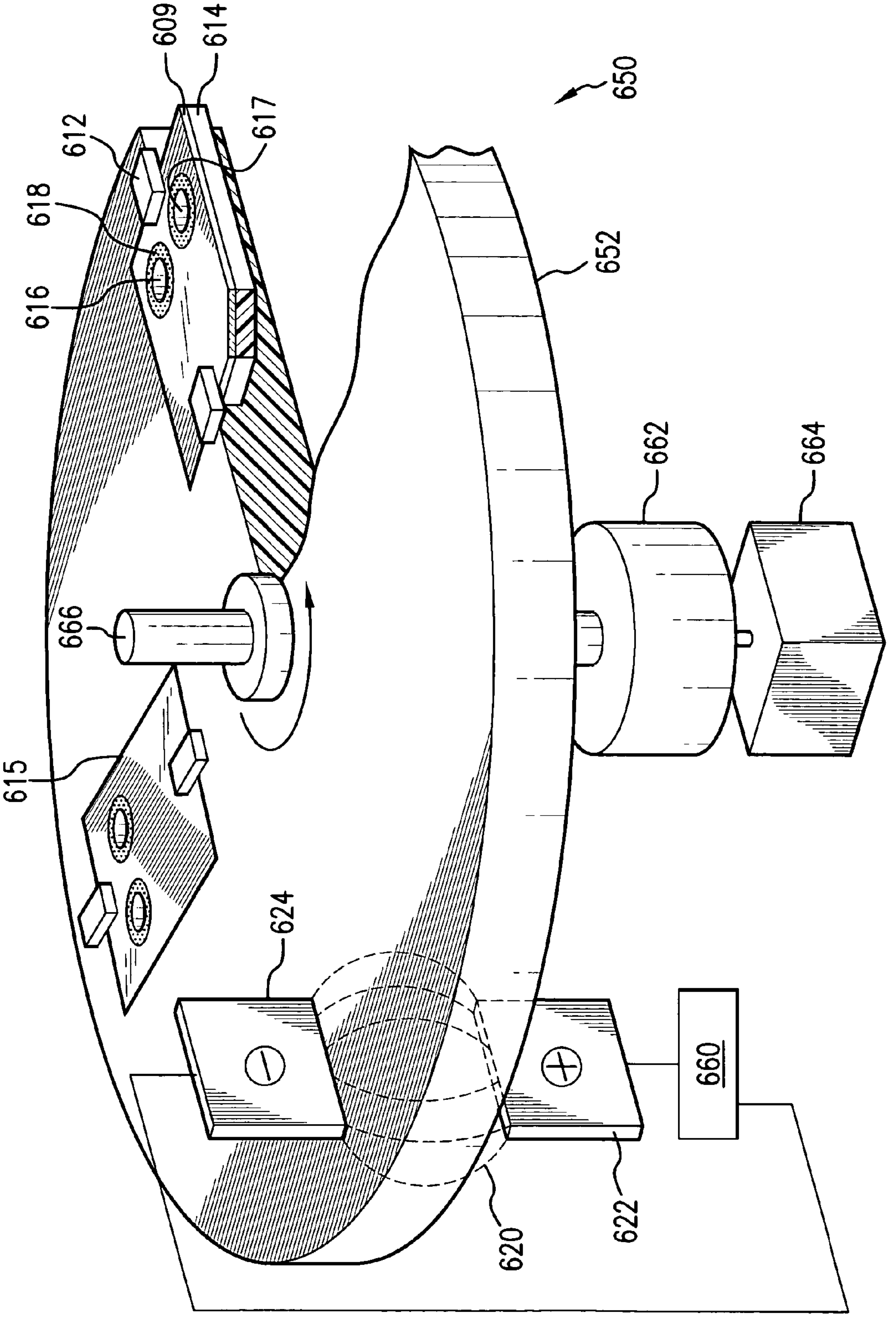
FIG. 6B is a perspective view of a system according to various embodiments.

FIG. 6B is a perspective view of a system 650 according to various embodiments. System 650 can comprise a platen 652 that can be spun by a shaft 666. Fluid-processing devices 614, 615 can be disposed in platen 652. Each fluid-processing device 614, 615 can comprise one or more fluid retainment regions 616, 617. An electrical conductor 618 can be disposed around each fluid retainment region 616, 617. Fluid-processing device 614 can be disposed on platen 652 using one or more holders 612. A cover layer 609 can be disposed on top of fluid-processing device 614. Shaft 666 can be spun using a drive device 662 controlled by a drive control device 664. One or more fluid retainment regions 616, 617 can traverse a magnetic field 620 formed between a magnet 624 and a magnet 622. Magnet 624 can be oriented to direct a south pole toward platen 652. Magnet 622 can be disposed to direct a north pole in the direction of platen 652. Magnets 622, 624 can be controlled by a magnet control device 660. Magnets 622, 624 can be adapted to reverse their respective poles. Fluid-processing devices 614, 615 can be spaced apart on platen 652 to maintain a rotational balance of platen 652. Fluid-processing devices 614, 615 can include one or more alignment features.

Figure 7:
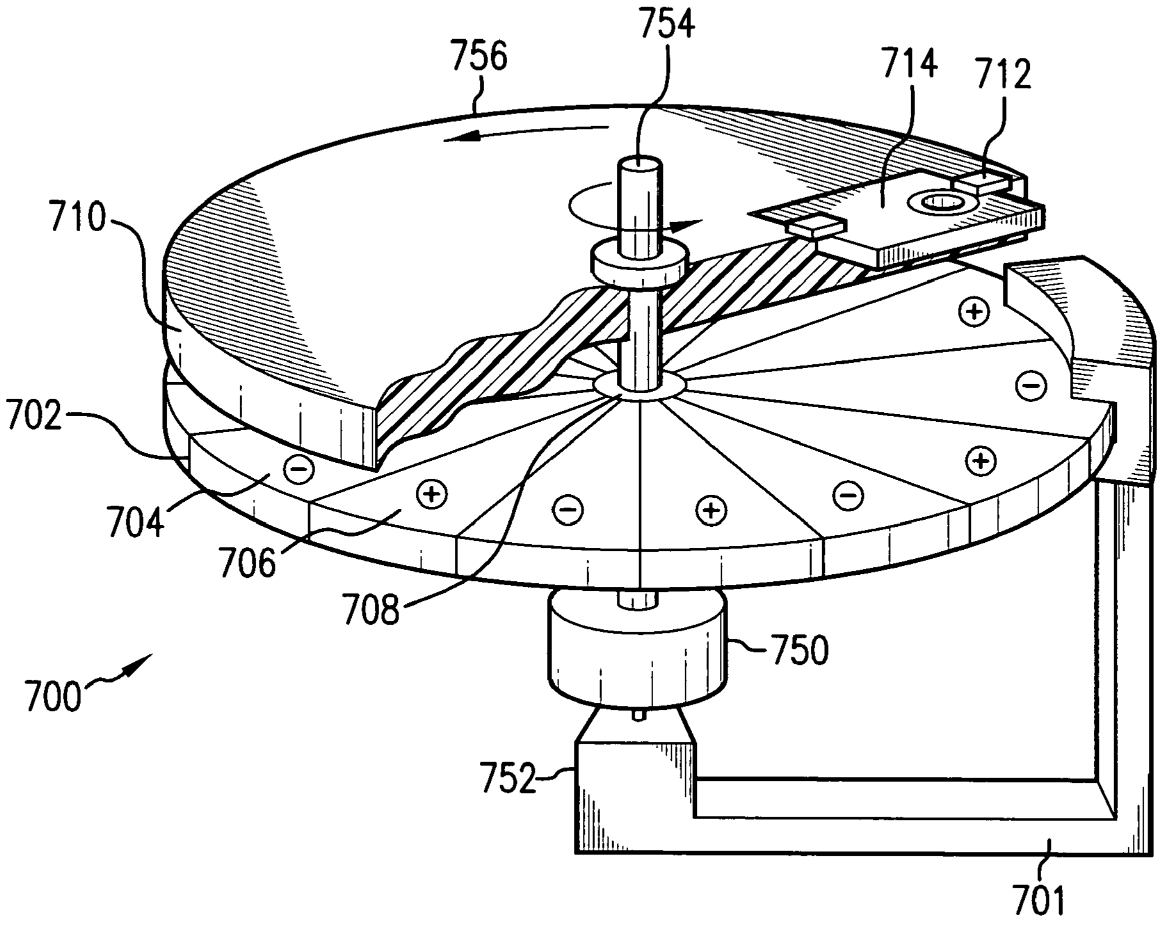
FIG. 7 is a perspective view of an arrangement of a magnetic field source and a platen according to various embodiments.

FIG. 7 shows a perspective view of a system 700 according to various embodiments. System 700 can comprise a platen 756 disposed to be spun around a shaft 754. A drive device 750 controlled by a drive control device 752 can spin shaft 754. A stationary magnetic platform 702 can be disposed around shaft 754 using a bearing 708, for example. A support 701 can support magnetic platform 702, to prevent magnetic platform 702 from spinning around shaft 754. A fluid-processing device 714 can be disposed in platen 710. One or more holders 712 can hold fluid-processing device 714. Magnetic platform 702 can comprise a plurality of magnets 704 and 706 to provide alternating orientations of a magnetic field. Magnetic platform 702 can be moveable axially with shaft 754 to alter or vary a distance from platen 756 to stationary magnetic platform 702. Upon rotation of platen 702, the interleaving arrangement of magnetic poles induces a current in each electrical conductor disposed as part of fluid-processing device 714. Alternatively, platen 756 can be held stationary or rotated in a different direction than magnetic platform 702.

Figure 8A:
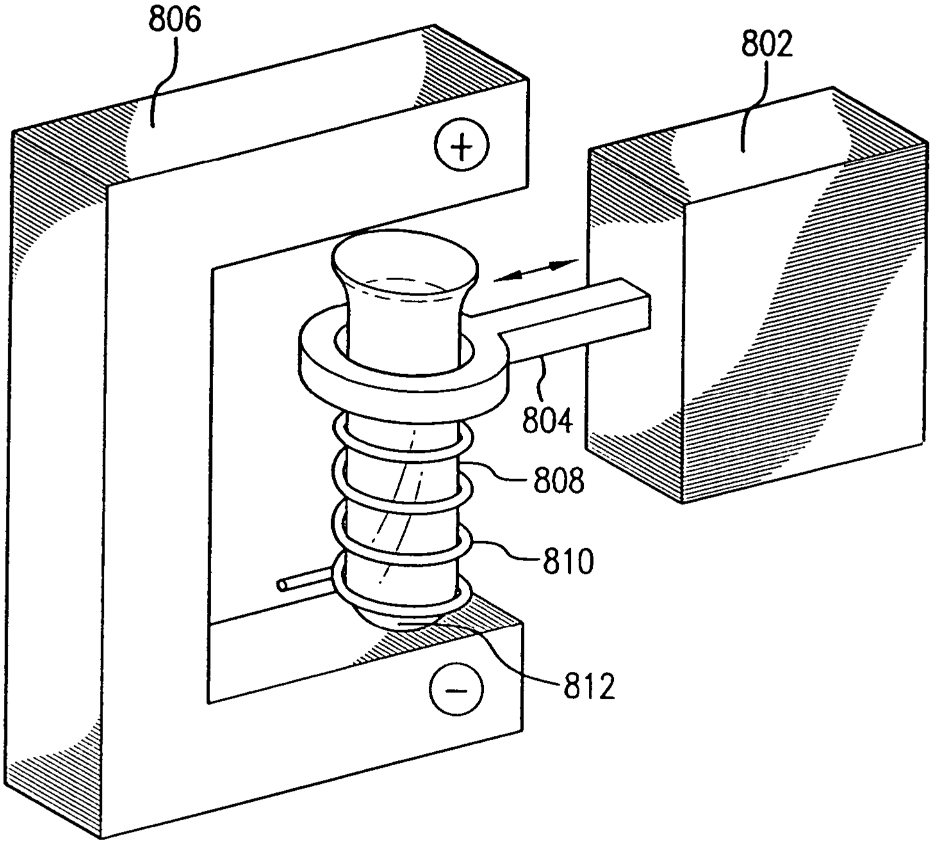
FIG. 8A is a perspective view of a system according to various embodiments.

FIG. 8A illustrates a system that uses a vibrator 802 and a fluid retainment region holder 804 to move a fluid retainment region 808 in a reciprocating motion in a gap between the north and south poles in a U-shaped or horseshoe-shaped magnet 806. An electrical conductor 810 can be disposed in or on a surface of the wall of fluid retainment region 808 in a spiral or helix pattern. The reciprocating movement of fluid retainment region 808 by vibrator 802 can cause a change in magnetic flux 814 effected on electrical conductor 810, causing a current to be induced. This current can cause inductive heating to occur, and raise a temperature of a sample 812 in heat-transfer communication with electrical conductor 810.

Figure 8B:
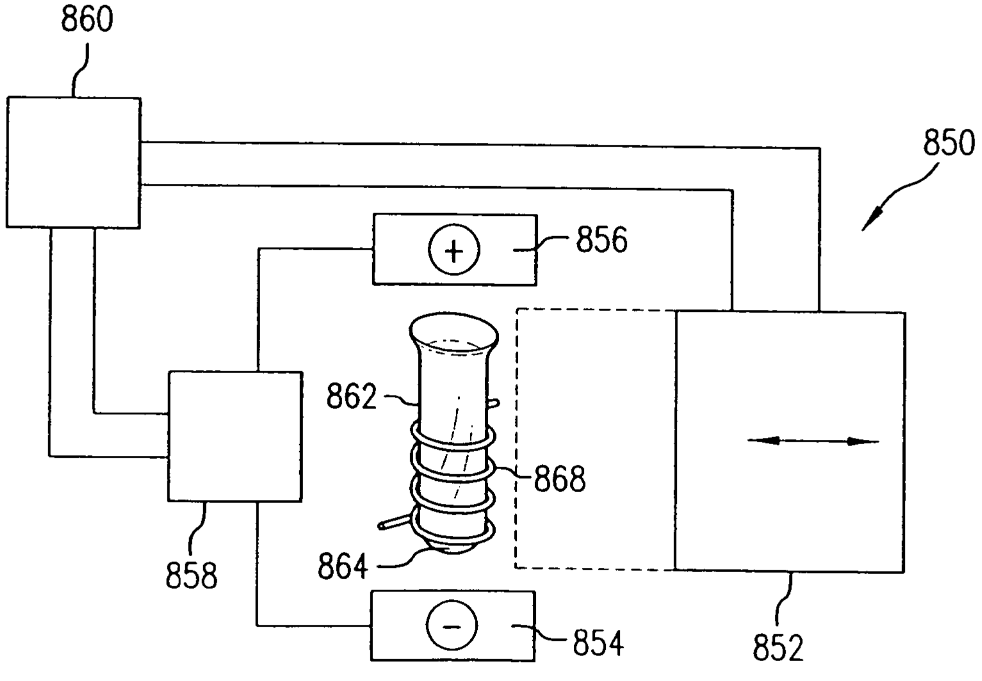
FIG. 8B is a schematic view of a system according to various embodiments.
Figure 9A:
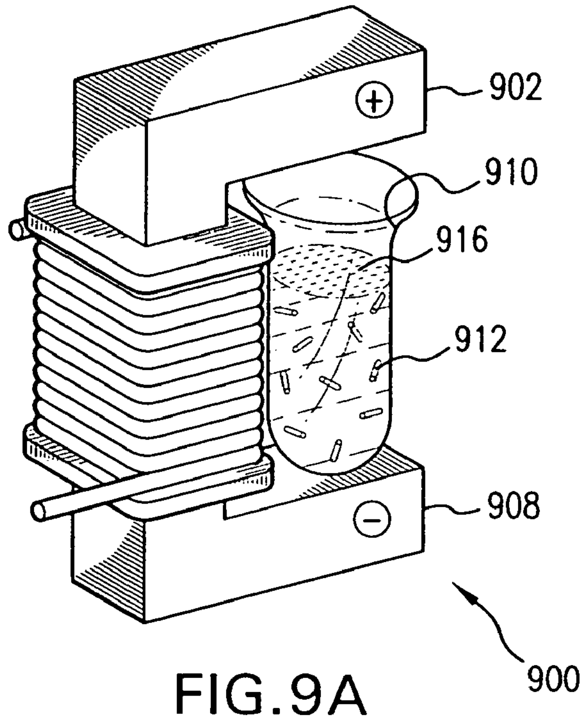
FIGS. 9A, 9B, 9C, and 9D are schematic views of a system according to various embodiments and particulates in a liquid to be heated.
Figure 9B:
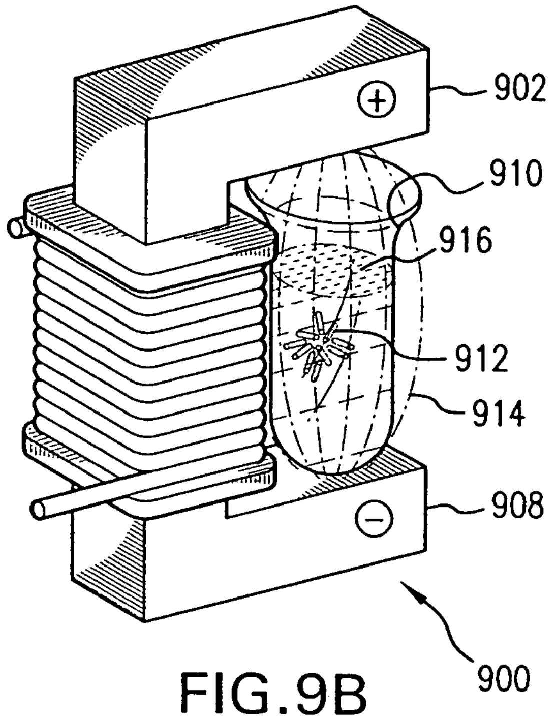
Figure 9C:
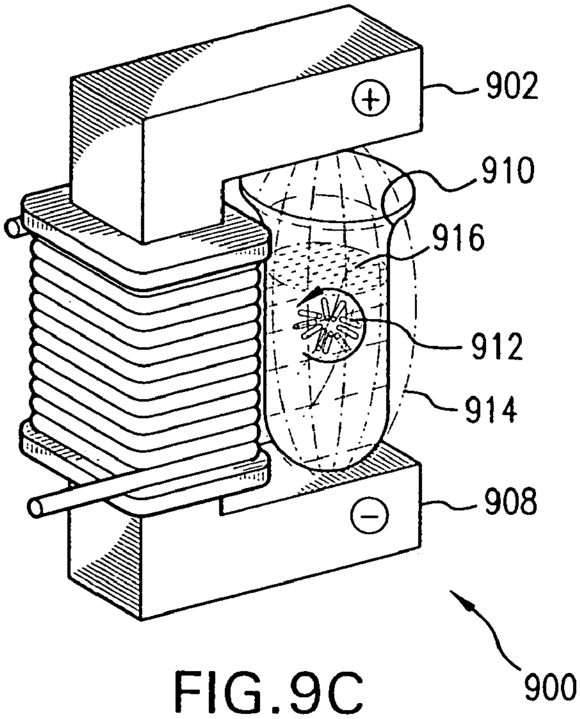
Figure 9D:
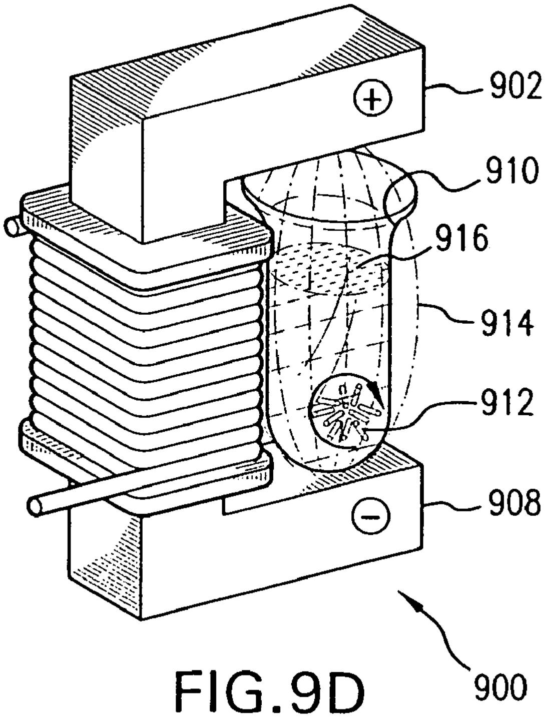

FIG. 8B illustrates a system 850 comprising electromagnets 854 and 856 that can be supplied with power from a power supply 858. Power supply 858 can be capable of supplying a Direct Current (DC) and an Alternating Current (AC). Power supply 858 can be controlled by a magnetic power control device 860. Magnetic power control device 860 can control the intensity of the magnetic flux between electromagnets 854 and 856 by varying the output of power supply 858. Magnetic power control device 860 can control power supply 858 and in turn control the amount of magnetic flux affecting an electrical conductor 868. This control of the magnetic flux can allow magnetic power control device 860 to tune and control a temperature increase rate of a sample in a sample holder 862. Magnetic power control device 860 can be a biological instrument controller coupled to a temperature sensor. The amount of magnetic flux affected on electrical conductor 868 can be changed by moving a shunt 852 into or out of the magnetic flux, for example, by mounting shunt 852 on a movable arm (not shown), or a solenoid. In various embodiments, movement of shunt 852 can be controlled by magnetic power control device 860.

FIGS. 9A, 9B, 9C, and 9D depict a system 900 that can be used to heat and/or mix a sample 916 using particulates 912 in a fluid retainment region 910. Sample 916 can be a biological suspension comprising particulates 912. A pair of magnets 902 and 908 or two respective poles of a U-shaped magnet can generate an oscillating magnetic field 914. Magnets 902 and

908 can be reversed or switched in various patterns to cause magnetic particulates 912 to spin and move about in sample 916 and/or heat sample 916 by induction currents induced in particulates 912. Magnets 902 and 908 can form a magnetic field adapted to move and/or trap particulates 912 against a portion of a wall of fluid retainment region 910. Particulates 912 can comprise materials that are paramagnetic, ferromagnetic, and/or diamagnetic, as desired. Different magnetic properties of particulates 912 can cause different motions in sample 916. Different compositions of particulates 912 can provide different heating properties. Particulates 912 can comprise different materials having different magnetic properties to heat and mix sample 916, as desired. In various embodiments, particulates 912 can be electrically conductive.

In various embodiments, the particulates can comprise electrically low or nonconductive magnetic material. The low or nonconductive material particulates can heat due to magnetic polarization losses, for example. An electrically conductive particulate can be coated, for example, with an electrically insulating plastic that is nonreactive with a reaction to take place in the fluid retainment region.

FIGS. 9A, 9B, 9C, and 9D collectively illustrate a possible movement pattern for particulates 912 disposed in sample 916. The movement pattern of the particulates 912 can result in a mixing of sample 916. A temperature sensor (not shown) and a thermal cycler control device (not shown) can be used with this system to control thermal parameters of sample 916. System 900 can be, for example, used in a thermal cycler to perform PCR on a sample. System 900 can be used to perform a thermal regulatory reaction such as an isothermal nucleic acid sequence amplification or sequencing reaction. In some embodiments, particulates 912 can be used for other processing of a biological sample in addition to a second reaction, for example, sample 916 can be lysed or ion-exchange-purified with particulates 912 as the particulates 912 are used to heat or mix sample 916. For example, an ion-exchange material coating can be provided on the particulates 912.

According to various embodiments, the particulates in the sample can comprise about 25% or less in volume of the sample, for example, about 10% or less, about 5% or less, about 1% or less, or about 0.25% or less, based on the volume of the sample. For example, a 30 nl sample can comprise about 10 particulates having a combined volume of about 7.5 nl or less, for example, about 3 nl or less, about 1.5 nl or less, about 0.3 nl or less, or about 0.075 nl or less.

Figure 10A:
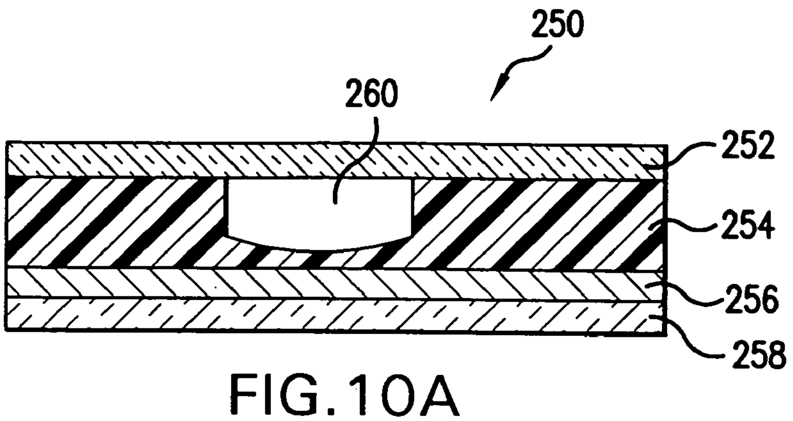
FIGS. 10A, 10B, and 10C are cross-sectional views of three different devices according to various embodiments.

Various embodiments of a fluid retainment region are described. Referring to FIG. 10A, a fluid processing device 250 can comprise a substrate 254 comprising a fluid retainment region 260. Fluid retainment region 260 can be defined as a well in substrate 254. An opening of fluid retainment region 260 can be defined in a surface of substrate 254. The opening can be closed using a cover 252. Cover 252 can be, for example, a non-conductive optical seal. Cover 252 and other covers described herein can be attached, secured, or otherwise affixed to the substrate 254 by, for example, an adhesive, a hot melt seal, a dielectric layer, a heat-seal arrangement, a combination thereof, or the like. For example, cover 252 can be adhered or otherwise attached to substrate 254 by a layer of polyethylene, another polyolefin, or a blended polymer. Cover 252 can be capable of being used for real-time PCR. Cover 252 can allow an excitation beam used, for example, in real-time PCR to pass through. An excitation beam emitted from a sample disposed in fluid retainment region 260 can pass through cover 252. Cover 252 can be disposed on substrate 254, for example, at least in a portion of substrate 254 wherein fluid retainment region 260 is disposed. A conductive layer 256 can be disposed on a surface opposite the surface comprising the opening. Conductive layer 256 can be disposed in at least in an area proximate fluid retainment region 260. A thermally insulating layer 258 can be optionally disposed in thermal contact with conductive layer 256. Thermally insulating layer 258 can prevent heat transfer from conductive layer 256 to a media off the fluid processing device, for example, air, a platen, or a fluid retainment region holder. Inductive heat produced in conductive layer 256 can be transferred to a sample disposed in fluid retainment region 250.

Figure 10B:
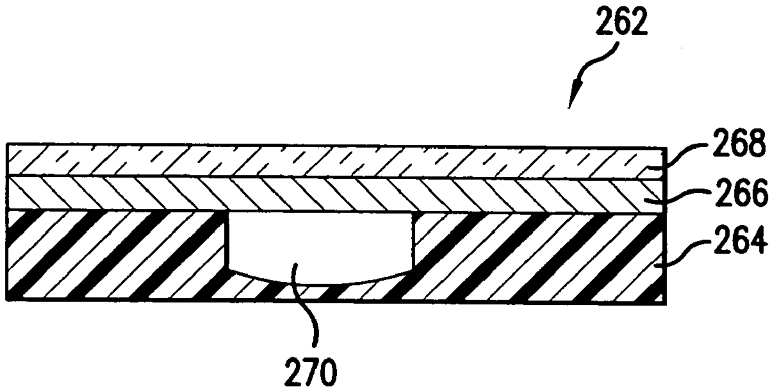

Referring to FIG. 10B, a fluid processing device 262 can comprise a substrate 264 comprising a fluid retainment region 270 disposed on or in substrate 264. A conductive layer 266 can close, seal, secure, or cover an opening of fluid retainment region 270. A thermally insulating layer 268 can be optionally disposed in thermal contact with conductive layer 266. Conductive layer 266 can be disposed in at least a portion of substrate 264 wherein fluid retainment region 270 is defined. Cover 252 and other covers described herein can be attached, secured, or otherwise affixed to the substrate 254 by, for example, an adhesive, a hot melt seal, a dielectric layer, a heat-seal arrangement, a combination thereof, or the like. For example, cover 252 can be adhered or otherwise attached to substrate 254 by a layer of polyethylene, another polyolefin, or a blended polymer. Thermally insulating layer 268 can be optionally disposed on conductive layer 266, for example, at least in a portion of conductive layer 266 wherein fluid retainment region 270 is defined in substrate 264.

Figure 10C:
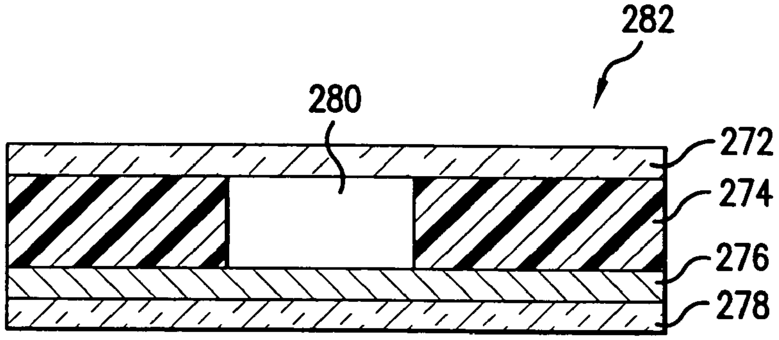

In another embodiment, referring to FIG. 10C, a fluid processing device 282 can comprise a substrate 274 comprising a fluid retainment region 280. Fluid retainment region 280 can comprise a through hole in substrate 274. A first end of fluid retainment region or through hole 280 can be sealed utilizing a conductive layer 276. A second end of fluid retainment region or through hole 280 can be sealed using a cover 272. Cover 272 can be electrically non-conductive. Cover 272 can be optically clear. A seal between cover 272 and substrate 274 can be formed using, for example, an adhesive, friction, or a thin layer of a liquid. Cover 252 and other covers described herein can be attached, secured, or otherwise affixed to the substrate 254 by, for example, an adhesive, a hot melt seal, a dielectric layer, a heat-seal arrangement, a combination thereof, or the like. For example, cover 252 can be adhered or otherwise attached to substrate 254 by a layer of polyethylene, another polyolefin, or a blended polymer. A seal between conductive layer 276 and substrate 274 can be formed using, for example, an adhesive, a friction, or a thin-layer of fluid (not shown). Inductive heat generated in conductive layer 276 can heat a sample disposed in fluid retainment region 280.

In various embodiments, an electrical conductor can be inductively heated, for example, using a stationary primary magnetic field, using a static magnetic field, and using a relative movement of the magnetic service and the conductive layer. The conductive layer can be in cyclic motion, for example, by spinning the substrate. The spinning of a substrate can allow a uniform heating of a fluid retainment region or a plurality of fluid retainment regions disposed on the substrate. In various embodiments, the conductive layer can be inductively heated by providing a cyclical motion to the conductive layer in a time-constant magnetic field. In various embodiments the conductive layer can be thin, for example, about 5 mm or less, about 2 mm or less, about 0.5 mm or less, about 0.25 mm or less, or about 0.10 mm or less. A thin conductive layer can increase conductive losses of the conductor, for example, by an increase in the resistance of the conductive layer. In various embodiments, a thin conductive layer can decrease the heat capacity of the conductive layer. This decrease in heat capacity can allow for faster temperature changes of the conductive layer. In various embodiments, utilizing a conductive layer as a seal for a fluid retainment region can increase thermal coupling between the conductive layer and the sample disposed in the fluid retainment region. This increase in thermal coupling can allow for faster heating of a sample disposed in the fluid retainment region.

The conductive layer can comprise a metal, a very thin metal, for example, foil. The conductive layer can be attached or affixed to the substrate, for example, using an adhesive. An adhesive can separate a sample from the conductive layer. In various embodiments, the adhesive can be utilized to provide separation between the conductive layer and fluid retainment region contents, for example, biological reagents, when the conductive layer is not compatible with a chemistry or a reaction to take place in the fluid retainment region. For example, a PCR reaction can be incompatible with a metal. A conductive layer can comprise a coating on the substrate. A conductive layer can comprise a printed layer on a substrate, for example, a layer of a conductive ink imprinted on the substrate.

According to various embodiments, a time of heat dissipation of a substrate can be reduced by utilizing a layer of thermally less conducting or thermally insulating material. A thermally insulating material can be disposed in or on the substrate, and can comprise a layer of a laminate comprising the substrate. The thickness and material of the thermally insulating layer can be utilized as parameters to achieve an optimum balance between cooling through a spinning of a substrate and a heating of the substrate through inductive heating.

Figure 10D:
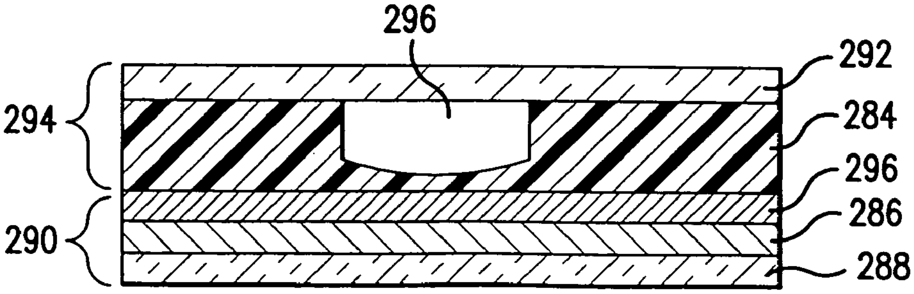
FIG. 10D is a cross-sectional view of a fluid retainment region and a platen comprising an electrical conductor.

FIG. 10D is an embodiment of a fluid processing device 294 comprising a substrate 284, a fluid retainment region 296, and a cover 292. Fluid processing device 294 can be disposed on a platen 290. Platen 290 can comprise a conductive layer 286. Platen 290 can optionally comprise a thermally insulating layer 288. Platen 290 can comprise a fluid processing device holder (not shown), adapted to hold fluid processing device 294 while platen 290 is subjected to a cyclical motion, for example, spinning or vibrating. Fluid processing device 294 can be disposed in a magnetic field. A thermal interface material 296 having a high thermal conductivity can be optionally disposed between conductive layer 286 and fluid processing device 294. Thermal interface material 296 can be a compressible material.

According to various embodiments, a thermal interface material (TIM) can provide a good thermal contact between two surfaces, for example, between a platen and a fluid processing device, or between a conductive layer and a substrate. The TIM can include silicone-based greases, elastomeric pads, thermally conductive tapes, thermally conductive adhesives, or a combination thereof. Zinc-oxide silicone can be used as a TIM. According to various embodiments, Gap-Pad products, for example, GAP PAD VO ULTRA SOFT materials or SIL-PAD, materials available from Berquist Company of Chanhassen, Minn., can be used as thermal interface materials. A TIM is described in U.S. Pat. No. 5,679,457 to Bergerson, which is incorporated herein in its entirety. According to various embodiments, a TIM can be disposed between a conductive layer and a substrate. In other embodiments, a TIM can be disposed between a platen and a fluid processing device.

In one embodiment, the fluid processing device can comprise no conductive layer. A platen can comprise a fluid processing device holder and a conductive layer. The fluid processing device, for example, a fluid processing device comprising a homogeneous polymer, can be disposed in the fluid processing device holder in thermal contact with the conductive layer on the platen. A compressible thermal coupler can be disposed in the fluid processing device holder. The plastic disc can comprise fluid retainment regions disposed therein. The conductive layer of the platen can be aligned with the fluid processing regions. The substrate can be spun in a magnetic field. The conductive layer will heat up by conductive heating. At least a portion of the heat generated by the conductive layer can be conducted to the fluid containment region. Via either a portion of a substrate or through a sealing film. The system comprising a platen comprising a conductive layer and a fluid processing device without a conductive layer can allow for low cost heating of the fluid retainment regions disposed in the fluid processing device.

Detection systems can be combined with the systems described herein to detect samples or products as they are processed. Exemplary detection systems that can be used include those described, for example, in co-pending U.S. patent application Ser. No. 10/440,719, filed May 19, 2003, in co-pending U.S. patent application Ser. No. 10/216,620, filed Aug. 9, 2002, in co-pending U.S. patent application Ser. No. 09/700,536, filed Nov. 29, 2001, in international patent application No. WO 99/60381, published Nov. 29, 1999, in co-pending U.S. patent application Ser. No. 10/440,920, filed May 19, 2003, in co-pending U.S. patent application Ser. No. 10/440,852, filed on May 19, 2003, in U.S. patent application Ser. No. 10/735,339, filed Dec. 12, 2003, and in co-pending U.S. patent application Ser. No. 10/981,440, filed on Nov. 4, 2004, all of which are incorporated herein in their entireties by reference. The combined systems can be used, for example, to perform real-time PCR detection on a sample.

According to various embodiments, iron, nickel, cobalt, some of the rare earths (gadolinium, dysprosium) exhibit ferromagnetic properties. Most of these materials can comprise poly-crystalline form. Samarium and neodymium in alloys with cobalt can be used to fabricate very strong rare-earth magnets. Such magnets can have very high coercivity, remanence, and maximum energy product. In other embodiments, some of the amorphous (non-crystalline) ferromagnetic metallic alloys can exhibit low coercivity, low hysteresis loss, and high permeability. Such amorphous alloys can be fabricated by very rapid quenching (cooling) of a liquid alloy (usually Fe, Co, or Ni with B, C, Si, P, or Al). One example of such an amorphous alloy is $Fe_{80}B_{20}$ (Metglas 2605).

Other embodiments of the present teachings will be apparent to those skilled in the art from consideration of the present specification and practice of the present teachings disclosed herein. It is intended that the present specification and examples be considered as exemplary.

What is claimed is:

1. A fluid processing device to perform real-time PCR on a sample, the device comprising:

a substrate comprising a top surface, wherein the substrate is adapted to heating and cooling the sample;

a plurality of fluid retainment regions disposed in or on the substrate for containing the sample, wherein the sample comprises PCR master mix and magnetic particulates;

one or more conductors in heat-transfer communication with at least one of the plurality of fluid retainment regions, wherein each of the one or more conductors comprises a material adapted to be inductively heated by a magnetically-induced electric current, wherein at least one of the conductors are contained in the magnetic particulates; and a cover layer disposed on the top surface closing at least one of the plurality of fluid retainment regions, wherein the cover layer is optically clear for detection of real-time PCR.

2. The fluid processing device of claim 1, wherein the material comprises a ferromagnetic material.

3. The fluid processing device of claim 1, wherein the material comprises one or more of a diamagnetic material and a paramagnetic material.

4. The fluid processing device of claim 1, wherein at least one of the plurality of fluid retainment regions comprises an opening and at least one of the one or more conductors seals the opening.

5. The fluid processing device of claim 1, wherein the one or more conductors are disposed embedded in a body of the substrate.

6. The fluid processing device of claim 1, wherein the one or more conductors are disposed in or on a wall of at least one fluid retainment region of the plurality of fluid retainment regions.

7. The fluid processing device of claim 1, wherein the substrate comprises a material having a thermal conductivity of about 0.5 Watts per meter Kelvin (W/m° K) or greater.

8. The fluid processing device of claim 1, further comprising:

one or more fluid retainment regions each comprising at least one wall; and one or more loops in heat-transfer communication with the at least one wall of at least one of the one or more fluid retainment regions and surrounding at least one of the one or more fluid retainment regions, wherein each of the one or more loops comprises a material adapted to be inductively heated by a magnetically-induced electric current.

9. The device of claim 8, wherein the one or more loops comprises a plurality of loops, each loop surrounding at least one of the one or more fluid retainment regions.

10. The device of claim 8, wherein the material comprises a metal, a metal alloy, or both.

11. The device of claim 1, further comprising: magnetic material particulates adapted to be heated by a magnetically-induced electric current in one or more of the magnetic material particulates.

12. The device of claim 11, wherein the magnetic material particulates have an average particulate diameter of about 50 microns or less.

13. The device of claim 11, wherein the magnetic material particulates are each coated with a plastic material.

14. The device of claim 11, wherein the biological material suspension comprises one or more reagents for a polymerase chain reaction.

* * * * *